J. E. Earle,

Corkscrew.

N° 79,216.  Patented June 23, 1868

Witnesses.
A. J. Tibbits
Michael Ryan

Inventor:
John E. Earle.

United States Patent Office.

JOHN E. EARLE, OF NEW HAVEN, CONNECTICUT.

Letters Patent No. 79,216, dated June 23, 1868.

IMPROVED CORKSCREW.

*The Schedule referred to in these Letters Patent and making part of the same.*

TO ALL WHOM IT MAY CONCERN:

Be it known that I, JOHN E. EARLE, of New Haven, in the county of New Haven, and State of Connecticut, have invented a new Improvement in Corkscrews; and I do hereby declare the following, when taken in connection with the accompanying drawings, and the letters of reference marked thereon, to be a full, clear, and exact description of the same, and which said drawings constitute part of this specification, and represent, in—

Figure 1:

Figure 1, a side view closed, and in

Figure 2:
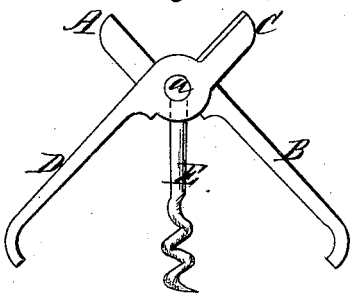

Figure 2 the same open.

This invention relates to an improvement in the means for withdrawing corks from bottles, the object being to combine with the ordinary corkscrew a means for cutting the wire which secures the cork, and to this end the invention consists in combining a pair of cutters with a common corkscrew, so that the handles by which the cutters are operated may also form a handle for operating the corkscrew.

To enable others to construct and use my improvement, I will proceed to describe the same as illustrated in the accompanying drawings.

A is one cutter, formed upon a handle, B; C, the other cutter, formed upon a handle, D, pivoted together at $a$, in the usual manner of common shears or cutters. Upon the same pivot, and between the two jaws, I hang a corkscrew, E, so that the handles may be opened therefrom as in fig. 2, at the same time opening the cutters. I prefer to make the handles as shown in the drawings, so as to close together and cover the corkscrew, as seen in fig. 1.

To cut the wires, the instrument is used in like manner as a common pair of shears. To use the cockscrew, spread the handles as seen in fig. 2, and insert and operate the corkscrew in the usual manner.

Figure 3:
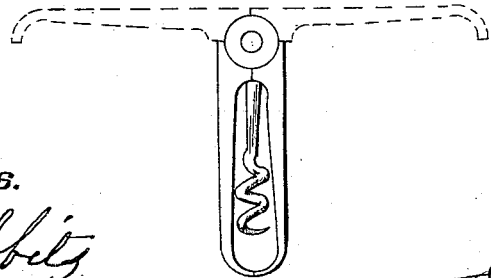

A convenient corkscrew may be made by leaving off the cutters, constructing the handle as seen in fig. 3, so as to open to a bearing, as denoted in red.

Having thus fully described my invention, what I claim as new and useful, and desire to secure by Letters Patent, is—

The combination of the two handles B and D with the corkscrew E, pivoted together so as to operate in the manner shown and described, and with or without the cutters A and C.

JOHN E. EARLE.

Witnesses:
A. J. TIBBITS,
MICHAEL RYAN.